US008788134B1

(12) United States Patent
Litkouhi et al.

(10) Patent No.: US 8,788,134 B1
(45) Date of Patent: Jul. 22, 2014

(54) AUTONOMOUS DRIVING MERGE MANAGEMENT SYSTEM

(71) Applicants: GM Global Technology Operations LLC, Detroit, MI (US); Carnegie Mellon University, Pittsburgh, PA (US)

(72) Inventors: Bakhtiar Brian Litkouhi, Washington, MI (US); Junqing Wei, Pittsburgh, PA (US); John M. Dolan, Pittsburgh, PA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/733,919

(22) Filed: Jan. 4, 2013

(51) Int. Cl.
   *G01C 22/00* (2006.01)
   *G05D 1/00* (2006.01)

(52) U.S. Cl.
   USPC .......................................................... 701/23

(58) Field of Classification Search
   CPC ......... G01C 21/26; G08G 1/16; G08G 1/167;
           G01S 13/931; G01S 2013/9332; G01S
           2013/935; G01S 2013/9353; B60W 30/08;
           B60W 30/12; B60W 30/16; B60W 30/085;
           B60W 30/0953; B60W 2550/306; B60W
           30/308; B60W 30/095; B60W 2550/30
   USPC ........ 701/23, 26, 36, 301–302; 340/901–905,
                                      340/435–436; 342/70, 455
   See application file for complete search history.

(56) References Cited

U.S. PATENT DOCUMENTS

| | | | | |
|---|---|---|---|---|
| 5,068,654 A | * | 11/1991 | Husher | 455/502 |
| 5,554,982 A | * | 9/1996 | Shirkey et al. | 340/903 |
| 6,232,887 B1 | * | 5/2001 | Carson | 340/903 |
| 7,102,496 B1 | * | 9/2006 | Ernst et al. | 340/436 |
| 2005/0015203 A1 | * | 1/2005 | Nishira | 701/301 |
| 2009/0082917 A1 | * | 3/2009 | Adachi | 701/33 |
| 2012/0150437 A1 | * | 6/2012 | Zeng et al. | 701/456 |
| 2013/0054106 A1 | * | 2/2013 | Schmudderich et al. | 701/96 |
| 2013/0099911 A1 | * | 4/2013 | Mudalige et al. | 340/438 |
| 2013/0151058 A1 | * | 6/2013 | Zagorski et al. | 701/23 |
| 2013/0321615 A1 | * | 12/2013 | Schofield | 348/118 |
| 2013/0338868 A1 | * | 12/2013 | Essame et al. | 701/23 |
| 2014/0032108 A1 | * | 1/2014 | Zeng et al. | 701/533 |

* cited by examiner

*Primary Examiner* — Yonel Beaulieu (57) ABSTRACT

An autonomous driving merge management system includes an autonomous driving control device and an intention decision management system. The management system includes a candidate strategy subsystem generating a plurality of candidate driving strategies, a merging vehicle behavior recognition subsystem predicting a merging intention of a merging vehicle; an intention-based interactive prediction subsystem predicting future merging scenarios between the host vehicle and merging vehicle as a function of inputs by the merging vehicle behavior recognition subsystem and inputs by the candidate strategy subsystem, and a cost function-based evaluation subsystem determining a cost for each future merging scenario generated by the intention-based interactive prediction subsystem. A processor selects a merge strategy of the host vehicle based on intention-based prediction results and cost function-based evaluation results. The autonomous driving control device applies the merge strategy to the host vehicle for allowing the merging vehicle to cooperatively merge with the host vehicle.

21 Claims, 7 Drawing Sheets

AUTONOMOUS DRIVING MERGE MANAGEMENT SYSTEM

BACKGROUND OF INVENTION

An embodiment relates generally to autonomous traffic merging behaviors.

Merging maneuvers includes at least one vehicle traveling in separate lanes wherein the vehicle must merge into a single lane of travel. The merging maneuver is performed implicitly by the driver of each vehicle wherein the driver individually decides whether they should merge in front of or behind the other vehicle. That is, each driver is not in communication with the other drivers and must make a decision on what merging position should be executed based on their observance of the relative position and speed between the two vehicles. The merging vehicle may speed up to merge ahead of the vehicle on the thoroughfare or slow down to merge behind the vehicle on the thoroughfare. Alternatively, the vehicle on the thoroughfare may speed up or slow down to accommodate the merging vehicle. In addition, the vehicle traveling on the thoroughfare may change lanes to accommodate the merging vehicle.

Often times drivers may choose to perform the same action as the other vehicle resulting in both vehicles accelerating or both vehicle decelerating at the same time thereby causing one of the vehicles to brake after it is realized that both vehicles are attempting a same acceleration action or deceleration action. As a result, one of the vehicles may brake to avoid a collision when it is apparent to one of the drivers that both drivers have the same intention such as merging ahead of the other vehicle. A change of speed such as braking may cause a chain of braking events for vehicles trailing the braking vehicle, which may ultimately lead to a traffic slow down or collision.

SUMMARY OF INVENTION

An advantage of an embodiment is an autonomous and cooperative merging between a merging vehicle and a host vehicle by recognizing the merging vehicles merging intentions and uses a cost technique to perform cooperative social behavior for merging the merging vehicle into traffic. An intention estimator extracts a probability of surrounding vehicles intentions in real time. Then for each surrounding candidate vehicle, a strategy is determined and a prediction engine considers the interaction between a host vehicle and surrounding candidate vehicle to predict future scenarios. Cost function-based evaluations are applied to determine the cost for each scenario and select the decision corresponding to the lowest cost.

An embodiment contemplates a method for autonomously controlling a vehicle speed during a merging maneuver between a host vehicle and a merging vehicle. Speed data and position data of the host vehicle and the remote data are obtained. A plurality of candidate driving strategies is generated by a processor. Each candidate driving strategy is a potential driving strategy executable by the host vehicle. An intention of the merging vehicle to merge forward or rearward of the host vehicle is predicted by the processor. A plurality of merging scenarios between the host vehicle and merging vehicle is generated by the processor as a function of a predicted merging intention of the merging vehicle and the plurality of candidate driving strategies. A cost for each merging scenario is determined by the processor based on a cost function evaluation analysis technique. A merge strategy of the host vehicle is selected by the processor based on the cost function evaluation results. Accelerations of a host vehicle are autonomously controlled using an autonomous driving control device. The autonomous driving control device applies the merge strategy to the host vehicle for cooperatively allowing the merging vehicle to cooperatively merge with the host vehicle.

An embodiment contemplates an autonomous driving merge management system that comprises an autonomous driving control device for autonomously controlling accelerations of a host vehicle and an intention decision management system. The intention decision management system comprises a candidate strategy subsystem generating a plurality of candidate driving strategies where each candidate driving strategy is a potential driving strategy executable by the host vehicle. A merging vehicle behavior recognition subsystem predicts a merging intention of a merging vehicle. The merging intention relates to a positive acceleration or a negative acceleration of the merging vehicle. An intention-based interactive prediction subsystem predicts future merging scenarios between the host vehicle and merging vehicle as a function of inputs by the merging vehicle behavior recognition subsystem and inputs by the candidate strategy subsystem. A cost function-based evaluation subsystem determines a cost for each future merging scenario generated by the intention-based interactive prediction subsystem. A processor selects a merge strategy of the host vehicle based on intention-based prediction results and cost function-based evaluation results. The autonomous driving control device applies the merge strategy to the host vehicle for allowing the merging vehicle to cooperatively merge with the host vehicle.

DETAILED DESCRIPTION

The availability of freeway and highway transportation has strongly contributed to efficient and faster travel between two locations. However, traffic congestion on road networks, including highways and freeways has become a bottleneck for further development of cities when the populated use of the roads grows well beyond the initial intended capacity. Autonomous vehicles have shown a potential to lessen this problem by reducing the number of traffic accidents and greatly increasing the capacity and efficiency of the transportation system. Recently, autonomous vehicle intelligence has increased from lane centering to actually driving on public roads with lane-changing capability. Nevertheless, human-driven vehicles still continue to be the dominate controls for driving a vehicle.

For human drivers, an intuitive cooperation occurs when a merging vehicle is nearby, consisting in an estimate of the other driver's intention and a corresponding reaction. Without intuition, in scenarios such as entrance ramps onto highways and freeways, it is difficult for an autonomous robot to behave in what might be termed a socially acceptable manner. Consequently, this will make it difficult for human drivers to understand, predict, and cooperate with autonomous vehicles.

There are few platforms that attempt to cooperatively interact between a human driver and an autonomous vehicle. System platforms include lane centering and cruise control-level autonomous driving on highways. Such autonomous vehicles are able to deal with relatively light human traffic; however, these vehicles do not perform as well in heavy traffic in comparison to human drivers due to their limited ability to understand and cooperate with surrounding cars.

Adaptive Cruise Control (ACC) is one of the most widely deployed advanced driver assist systems. This system senses a vehicle forward of the vehicle and attempts to maintain a minimum spacing between the autonomous driven vehicle and the vehicle forward of the autonomous vehicle. However, the problem with ACC systems is that the system is only capable of limited single-lane highway autonomy.

In human driver behavior models, experienced human drivers can understand each other's intentions and smoothly cooperate with each other while driving. Therefore, it is reasonable to utilize a human driver behavior model to control an autonomous vehicle. However, it has been found that in such models, temporal and some unobservable state information (e.g. intention) of surrounding vehicles are not used because of the difficulty of data collection and complexity of model training. Therefore, such systems have difficulty emulating human decisions at the social cooperation level.

In a fully autonomous driving system, a motion planner typically commands the vehicle's lateral and longitudinal movements. The most straightforward way to safely avoid moving obstacles is to regard them as static obstacles cycle by cycle and use a re-planning mechanism to react to these obstacles in real time. A more advanced approach is to assume moving obstacles will keep constant velocity and heading. However, the deficiency is that the assumption must be made that moving obstacles will keep constant velocity while driving along the road. None of these assumptions captures the fact that the host autonomous vehicle's movement will affect surrounding vehicles' behavior.

A proposed prediction and cost function-based (PCB) system and technique is described herein for autonomous freeway driving applications. The PCB framework is extended via a sampled-based approach to deal with sensor uncertainties and field-of-view constraints. The sample-based PCB algorithm is integrated with a Bayesian driving intention recognition model for the autonomous vehicle for performing social behavior. This intention-integrated Prediction-and Cost function-based (iPCB) system is implemented and tested in a simulated scenario of social cooperation with vehicles merging from freeway entrance ramps.

Figure 1:
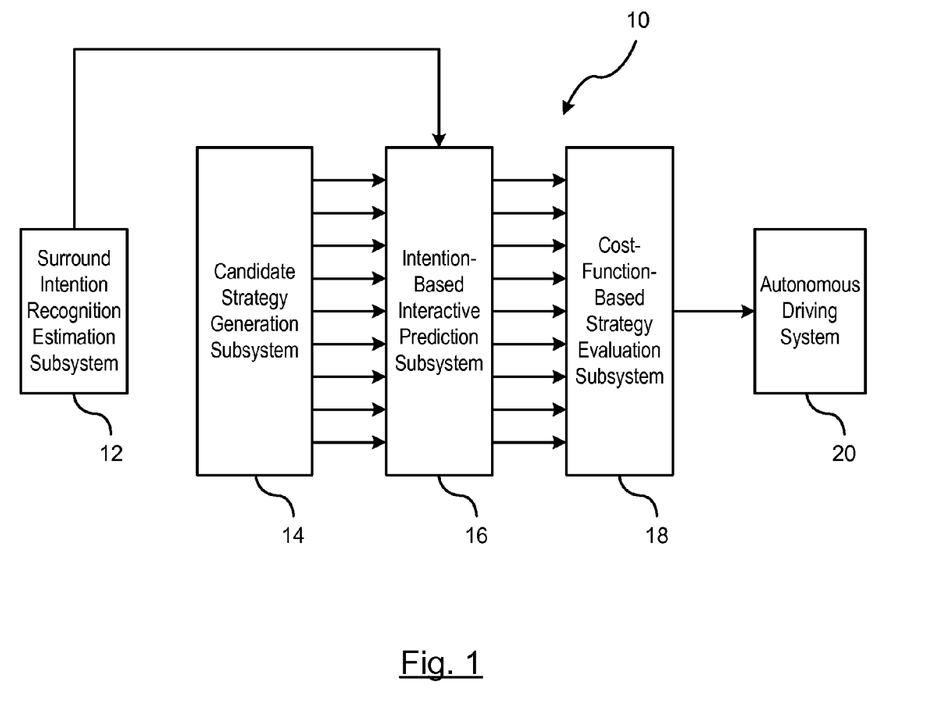
FIG. 1 is a block diagram of an intention-integrated prediction- and cost function-based system.

As shown in FIG. 1, there are four main subsystems in the iPCB system 10. The system includes a surrounding intention recognition estimation subsystem 12, a candidate strategy generation subsystem 14, an intention-based interactive prediction subsystem 16, a cost function-based strategy evaluation subsystem 18, and a controller in the autonomous driving system 20. It should be understood that each respective subsystem may utilize separate processors, controllers, and memory, or may share a processors, controllers, and memory.

The surrounding intention recognition estimation subsystem 12 captures the surrounding vehicle information input from the autonomous vehicle's perception system. The surrounding intention recognition subsystem uses a knowledge-based technique to output the probability of each surrounding vehicle's intention to the intention based interference prediction subsystem 16.

The candidate strategy generation subsystem 14 proposes a plurality of candidate driving strategies for the host vehicle to execute. The plurality of candidate driving strategies include sets of accelerations (i.e., positive accelerations) and/or decelerations (negative accelerations) applied by the host vehicle when encountering a vehicle merging into its lane. The intention-integrated prediction subsystem 16 uses the surrounding vehicles' intentions provided by the merging vehicle behavior recognition system 12 to predict the future traffic scenario assuming each of the candidate strategies is applied. The cost function-based evaluation subsystem 18 computes costs for each scenario and sums them together as the strategy cost. The autonomous driving system 20 selects the best strategy corresponding to the lowest cost and performs an autonomous merging maneuver.

Figure 2:
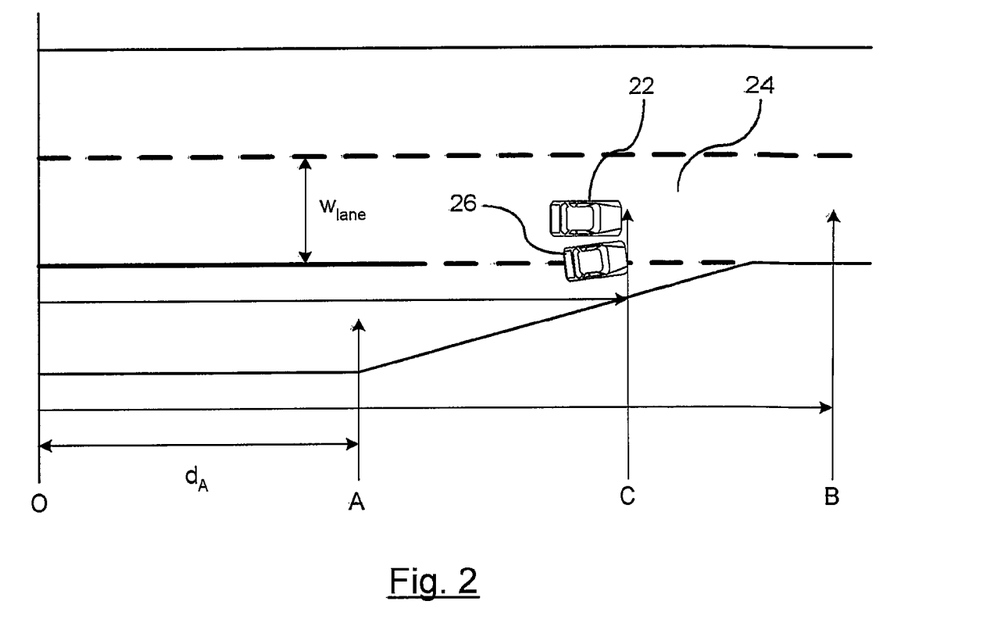
FIG. 2 is an illustration of a freeway entrance ramp with merging vehicles.

To describe the operation of the iPCB system 10, a freeway entrance ramp management is selected which represents a difficult scenario where vehicles (autonomous or nonautonomous) need to exhibit social behavior, and the iPCB technique can be applied. For the entrance ramp management system, a scenario is shown in FIG. 2. A host vehicle 22 is driving in the rightmost lane of the freeway 24. Start point A of the entrance ramp is a location where the autonomous vehicle begins to consider the intentions of the merging vehicle 26. End point B is a location of the entrance ramp where there merging vehicle 26 fully merges in the rightmost lane of the freeway 24. Distances $d_A$ and $d_B$ are the longitudinal distances from a reference point O to points A and B. Point C in FIG. 2 is defined as the point at which the interaction between the two vehicles needs to be complete. The position of C and $d_C$ is computed using the following formula:

$$d_C = d_A + (d_B - d_A)/\omega_{lane} \cdot (\omega\text{lane} - \omega_{car}) \quad (1)$$

where $\omega_{lane}$ is the width of the lane and $\omega_{car}$ is the width of the merging vehicle.

After point C, the vehicles should return to their normal lane driving and distance keeping mode. For the example described herein, all scenarios are implemented with parameters $d_A = 40$ m, $d_B = 120$ m, $\omega_{lane} = 6$ m, $\omega_{car} = 2$ m.

In this embodiment, only the autonomous vehicle's single-lane driving performance is considered, which means the host vehicle 22 (autonomous vehicle) will keep performing lane centering in its current lane without changing to another lane. The host vehicle's function is to adjust speed by changing its acceleration $g_{host}$. The host vehicle's state is given by $d_{host}$, $v_{host}$ and $l_{host}$ where $d_{host}$ and $v_{host}$ are respectively the longitudinal distance and speed of the autonomous vehicle, and $l_{host}$ is the lateral position of the host vehicle 22.

It is assumed that the merging vehicle 26 will merge along a fixed path corresponding to the center line of the entrance ramp. Similarly to the host vehicle, it has observable state $d_{merge}$, $v_{merge}$ and $l_{merge}$ obtainable from the perception system of the autonomous vehicle. In addition, to represent the autonomous vehicle's understanding of the merging vehicle's behavior, an intention state $i_{merge}$ is included which can be either Yield (Y) or Not Yield (NY).

For other remote vehicles, including vehicles in adjacent lanes and any vehicles leading or following the autonomous vehicle, parameters $d_i$, $v_i$ and $l_i$ are used to represent other remote vehicle's longitudinal position, speed, and lateral distance.

A first step in the iPCB process framework is to generate a statistical model by estimating the merging vehicle intention I and use probability, p(I=Y) or p(Y) (i.e., the probability of the merging vehicle to yield) and p(I=N) or p(N) (i.e., the probability of the merging vehicle to not yield) to capture the uncertainty of the estimation. The intention recognition mechanism proposed herein referred to as the merging vehicle behavior recognition technique is based on Bayes' theorem as represented as follows:

$$p(Y|B) = p(B|Y)p(Y)/[p(Y)p(B|Y) + p(N)p(B|N)] \quad (2)$$
$$= p(B|Y) \times 0.5/[0.5p(B|Y) + 0.5p(B|N)]$$
$$= p(B|Y)/[p(B/Y) + p(B|N)]$$

where p(Y|B) is the probability of merging vehicle's intention to yield (Y) given an observed behavior B, and p(B|Y) and p(B|N) are respectively the probabilities of that same behavior given intention Y or N. As no prior knowledge of the intention of the merging vehicle is available, the most difficult scenario is selected and the probability of yield p(Y) and not yield p(N) are both set to 0.5.

To estimate intent of the merging vehicle, the acceleration of the merging vehicle must be determined. The acceleration may be captured by sensing devices of the host vehicle or may be obtained through vehicle-to-vehicle communications between the host vehicle and the merging vehicle. A decelerating vehicle is more likely to intend to yield to host vehicle, and an accelerating vehicle less likely to yield to the host vehicle. Therefore, the acceleration is computed from the velocity measurement of the merging vehicle and is represented as follows:

$$acct(t) = (v(t) - v(t - t_{filter}))/t_{filter} \quad (3)$$

where v(t) is the observed merging vehicle velocity at time t and $t_{filter}$ is the filtering horizon.

A merging vehicle behavior model B|I is generated representing the behavior B (acceleration or deceleration) expected from the merging vehicle given a particular intention I. If the merging vehicle intends to yield to the host vehicle, it will tend to merge into the lane of the host vehicle with a proper forward distance to the host vehicle. Otherwise, the merging vehicle will try to get ahead of the host vehicle and keep a reasonable backward distance when it enters the lane.

Figure 3:
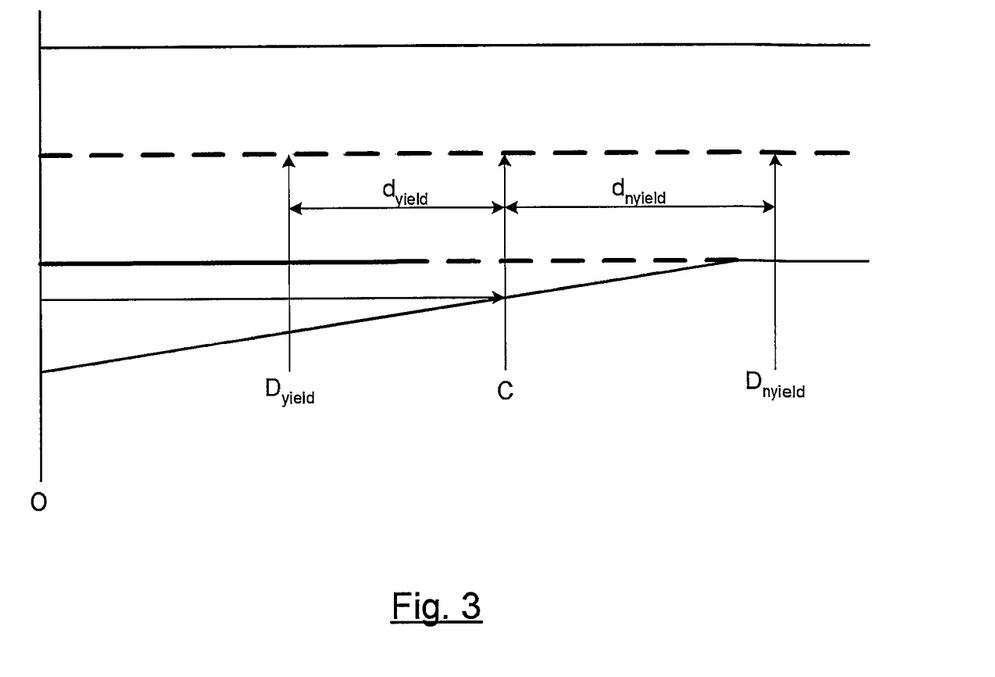
FIG. 3 is an illustration of a freeway entrance ramp identifying key positions along the entrance ramp.

To generate the statistical model, a deterministic model is first generated and then the deterministic model is converted to a statistical model utilizing a Gaussian distribution. The deterministic model will provide a position and velocity of the merging vehicle from a kinematics point of view for identifying where the merging vehicle will be. FIG. 3 illustrates the freeway entrance ramp identifying key positions along the entrance ramp. Point C represents an end of the interaction region. Points $D_{yield}$ and $D_{nyield}$ are locations where the merging vehicle is supposed to be when the host vehicle arrives at C for the yield and not-yield cases, respectively. Equations for a deterministic model are as follows:

$$d_{yield} = d_C - (d_{min} + k_v v_{host})$$

$$d_{nyield} = d_c + (d_{min} + k_v v_{host})$$

$$\Delta t = (d_{yield,nyield} - d_{merge})/v_{merge} - (d_C - d_{host})/v_{host}$$

$$acc_{merge} = c_{gain} \Delta t \quad (4)$$

where $d_{yield}$ is the distance from C to $D_{yield}$, $d_{nyield}$ the distance from C to $D_{nyield}$, $d_{min}$ is the minimum desired distance to the leading vehicle, k is a gain causing the desired distance to grow with the host vehicle's speed, $d_{merge}$ and $d_{host}$ are the positions of the merging and host vehicles at any given instance of time. The desired control command for the merging vehicle $acc_{merge}$ is computed using a proportional controller applied to the difference between the arrival times of the merging vehicle and the autonomous vehicle, where $\Delta t$ is the time difference between the two vehicles' arrivals at C, and $c_{gain}$ is the proportional gain converting the time difference into the acceleration command of the merging vehicle.

Figure 4A:
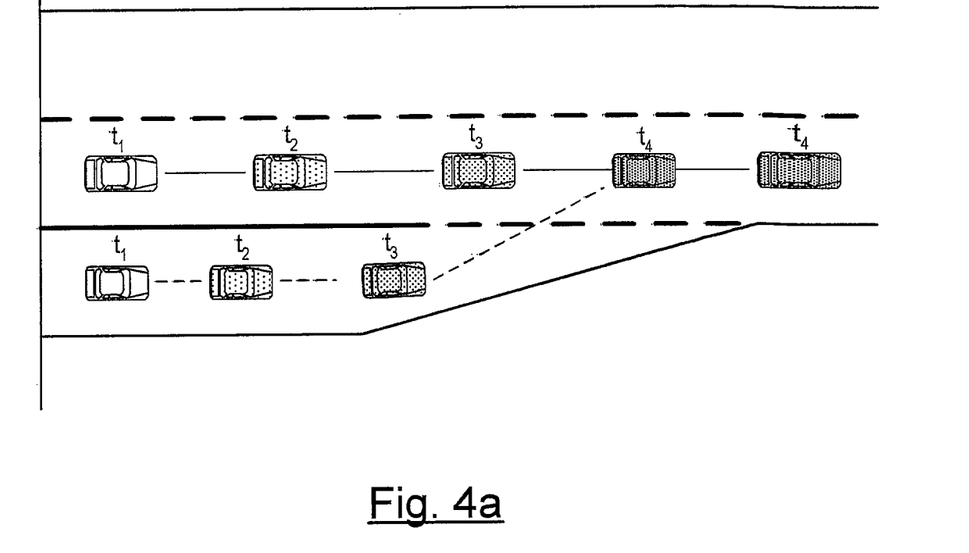
FIG. 4a represents a simulation result for a merging vehicle given an intention to yield.
Figure 4B:
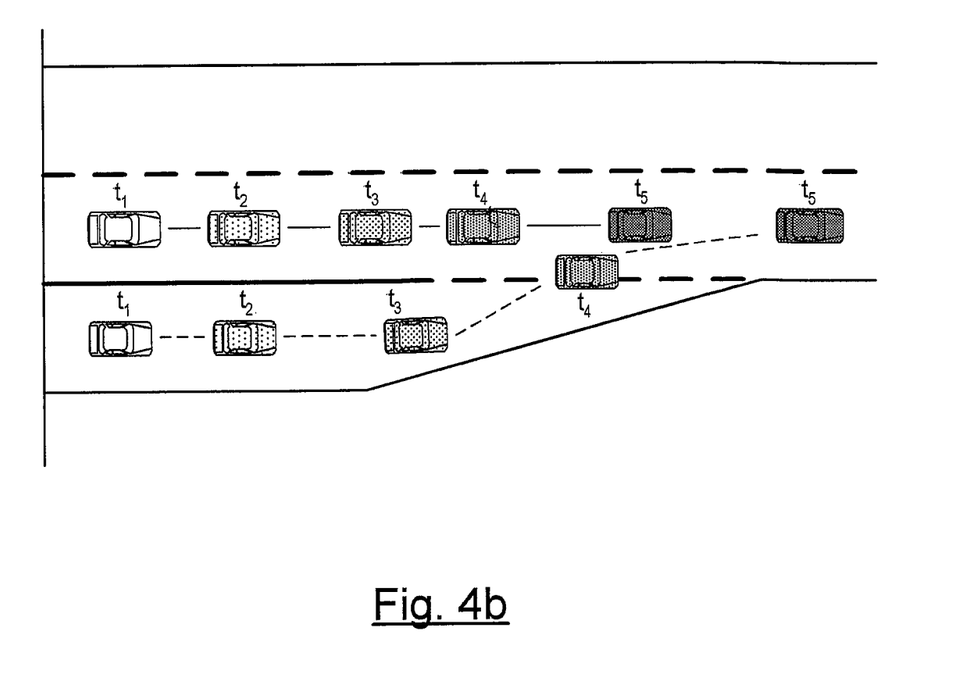
FIG. 4b represents a simulation result for a merging vehicle given an intention not to yield.

Simulation results are shown in FIGS. 4a and 4b. In FIG. 4a, the merging vehicle is given an intention (I) of Yield, so it gradually applies deceleration and eventually merges into the main lane behind the host vehicle with the desired distance to the leader. Under this intention (I), the merging vehicle should try to reach $D_{yield}$ when the host vehicle is at C. In FIG. 4b, the merging vehicle is given an intention (I) of Not Yield, so merging vehicle accelerates to merge in front of the host vehicle. Under this intention (I), the merging vehicle should try to reach $D_{nyield}$ when the host vehicle is at C. This model can emulate the behavior of a merging vehicle performing speed adjustment to enact its intention.

Figure 5:
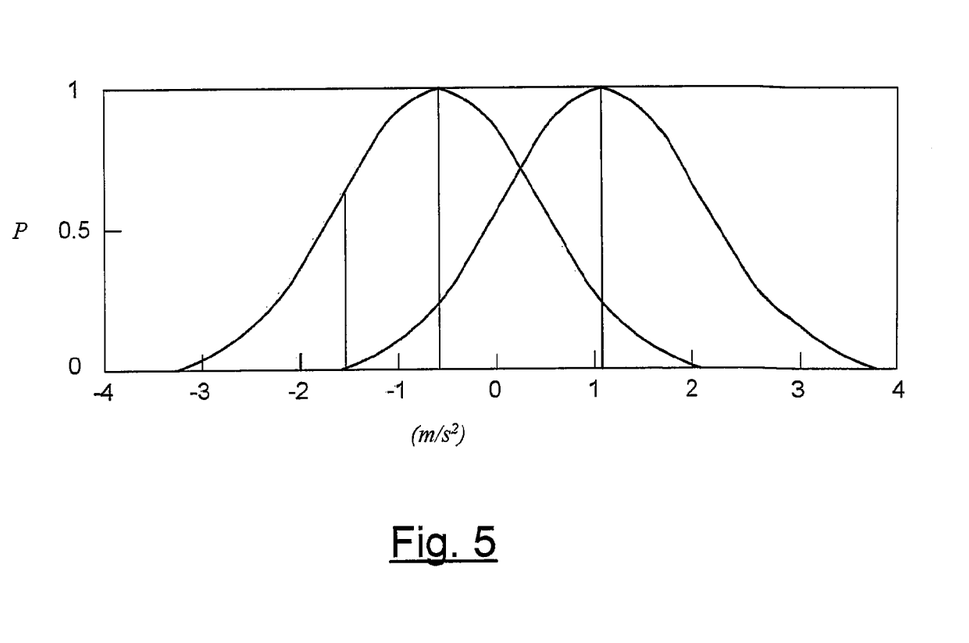
FIG. 5 illustrates a graph identifying exemplary probability estimates of merging vehicle accelerations given two possible merging intentions.

The following description utilizes a deterministic model of B|I for converting the model to a statistical (i.e., probabilistic) model. Although the deterministic model provides details as to the position and velocity of the merging vehicle, the deterministic model does not provide foresight as to the intentions of the merging vehicle. Therefore, by integrating intent with the deterministic model, the intentions of the merging model can be estimated with a respective confidence level. Under this scenario, the model is extended by superimposing a Gaussian distribution with its peak at the $acc_{merge}$ values for B|Y and B|N and standard deviation $\sigma = 0.8$ m/s$^2$, as shown in FIG. 5. B|Y represents the merging vehicle's intention to yield, whereas B|N represents the merging vehicle's intention to not yield. The graph shown in FIG. 5 gives exemplary probabilistic estimates P(B|Y) and p(B|N) of the merging vehicle acceleration given the two possible intentions and is used to capture the uncertainty-based deviation of the merging vehicle's behavior from the B|I model. It should be understood that other probabilistic distributions can be considered. By integrating p(B|I) with the Bayesian rule in Eq. 2, a merging vehicle intention probability estimator is produced. As a result, a social behavior of the merging vehicle can be quantified.

Figure 6A:
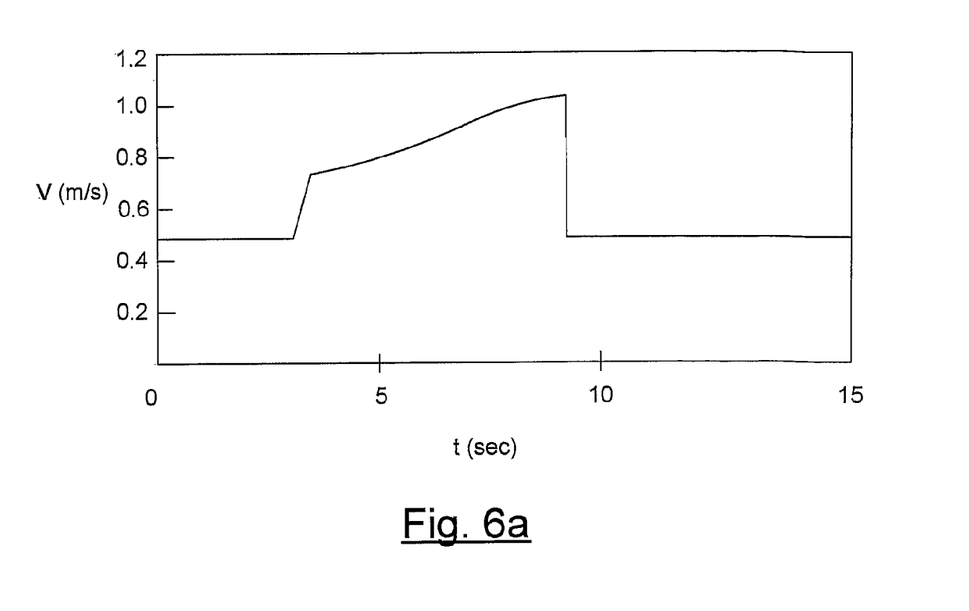
FIG. 6a illustrates is an exemplary estimated probability of a merging intention to yield.
Figure 6B:
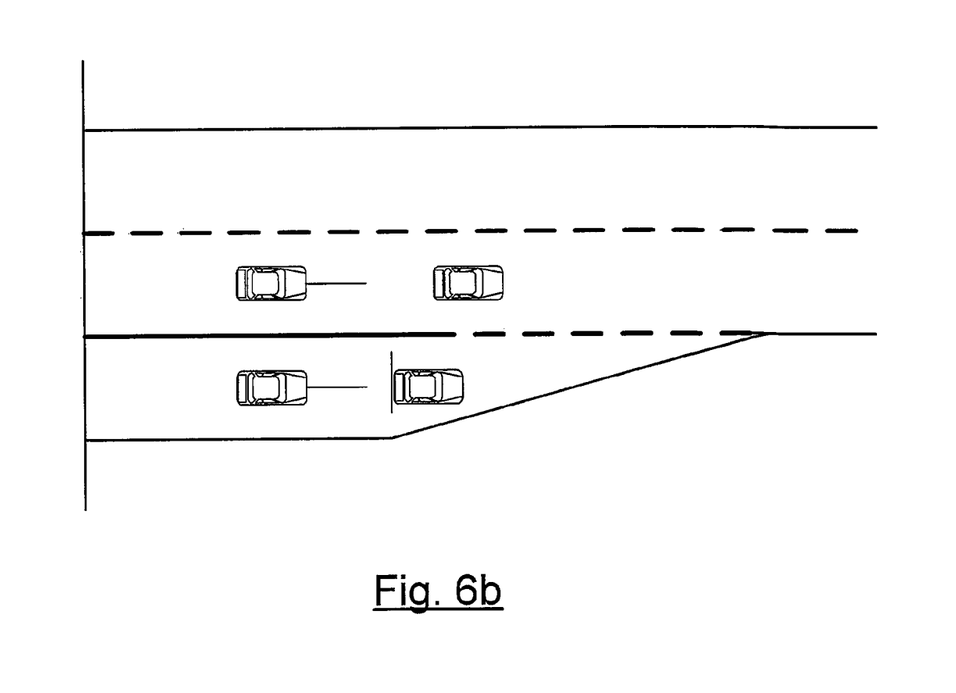
FIG. 6b illustrates a corresponding entrance ramp scenario at a first and second time period.

FIGS. 6a and 6b illustrate verification results implemented in simulation to verify the intention estimator's performance. The test parameters were provided that the merging vehicle was given a certain intention (I=Y or I=N) and followed the model B|I. The results of the real-time intention probability recognition are illustrated in FIG. 6a. Corresponding scenarios are shown in FIG. 6b. In FIG. 6b, the vehicle begins to perform minor adjustment of its speed around t=4.0 s. FIG. 6b also shows the corresponding scenarios at t=6.0 s. The intention estimator captures the initial behavior and outputs a probability of intention of the merging vehicle. The intention estimation results are very ambiguous at the beginning, but as the merging vehicle gets closer to point C around t=6.0 s, confidence of the estimation result increases rapidly.

Although the command for the autonomous vehicle in the freeway entrance ramp management system is an instantaneous velocity command, the host vehicle is attempting to identity an immediate and best available action based on the actions of the merging vehicle. The host vehicle also needs to consider a series of future control commands, (i.e., a velocity profile for the next $t_{predictLength}$ in seconds). Due to the real-time requirement and limited computation power, only a limited number of strategies can be searched and evaluated. Therefore, a discretization of the strategy set is used.

Figure 7:
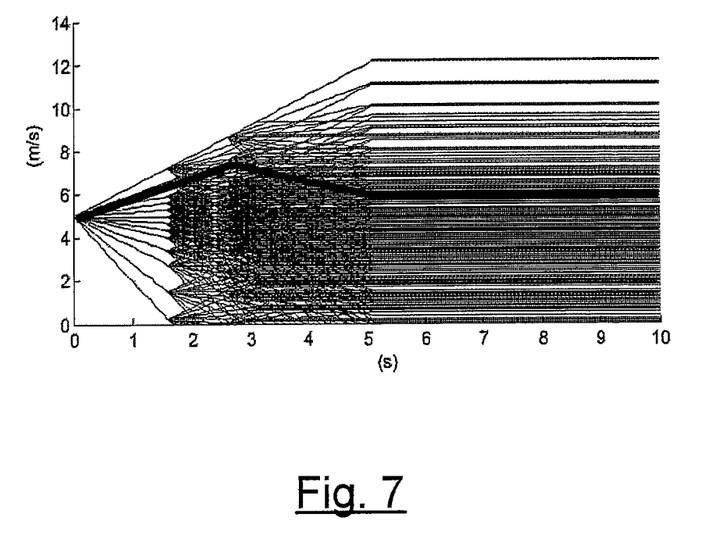
FIG. 7 is a plot of discretization velocity strategies.

FIG. 7 illustrates the discretization strategies of the host vehicle. The strategies include velocity profiles that are plotted as velocity (m/sec) over time (sec). Each of the strategies includes various combinations of positive acceleration and or negative accelerations that the host vehicle may utilize when encountering a vehicle merging within its lane. For example, the velocity provides may include a positive acceleration that changes to elevated acceleration, a negative acceleration that changes to a lower negative acceleration, a positive acceleration that changes to a negative acceleration, and a negative acceleration that changes to a positive acceleration.

Each velocity profile is represented by three parameters: $t_{adjust}$, the total speed adjustment time, $a_{first}$ which is the acceleration amplitude for the first half of $t_{adjust}$, and $a_{second}$ which is the acceleration amplitude for the second half of $t_{adjust}$. The entire timeframe $t_{predictLength}$ is chosen to be 10.0 seconds and is discretized into two values, 3.0 s or 5.0 s. There are 13 different acceleration options covering the range from −3.0 m/s² to 2.0 m/s². The candidate strategy generator outputs 378 strategies in all, which allows the iPCB algorithm to re-assess the host vehicle strategy in relation to the merging vehicle fast enough for the real-time implementation. As a result, the host vehicle can force a respective strategy in an attempt to illicit a respective intention of the merging vehicle.

After the candidate strategy generation, a prediction engine is used to simulate future scenarios for each strategy. For surrounding vehicles, including the leading or following vehicle of the autonomous car, the following prediction model:

$$\Delta d_l = d_l - d_{v(t)} \quad (5)$$

$$a_{v(t)} = \begin{cases} \mu_{free}(v_{lim} - v_{v(t)}) & \text{if } \Delta d_i > 100 \\ \mu_{dk}(d_d - d_l) + \mu_{dkv}(v_l - v_{v(t)}) & \text{if } \Delta d_i < 100 \end{cases}$$

where $\Delta d_l$ is the distance to vehicle $v_i$'s leader, $\mu_{free}$ is the proportional gain for the vehicle to gradually approach the speed limit when there are no obstacles in front of it, $\mu_{dk}$ is the proportional gain of the distance keeping controller, and $\mu_{dkv}$ is the proportional gain on the velocity difference between the leader and the vehicle $v_i$.

The intention of a merging vehicle from the intention recognition technique will be used to determine a more accurate prediction. The model as described earlier to generate B|I is used. The following steps are used with the B|I model. When the merging car's yield/not yield decision is obvious, the input I will be overridden, as identified in the following equation:

$$I = \begin{cases} Y, & \text{if } \Delta t > 3.0 \\ N, & \text{if } \Delta t < 3.0 \end{cases} \quad (6)$$

where $\Delta t$ is computed using Eq. 4. For instance, if the merging vehicle is much slower than and far behind the host vehicle, it will surely yield to the host vehicle. In these cases, only one intention will be considered in prediction.

An important effect of this override mechanism is that even when a merging vehicle intention ambiguity exists at the beginning of the prediction, if the host vehicle performs a certain behavior, it has the ability to force the merging vehicle to converge to a predictable decision.

The interactive prediction module gives the iPCB framework the ability to predict how surrounding vehicles will react to the host vehicle's strategy, which is a key factor enabling the autonomous vehicle to socially interact with them. Compared with the prediction mechanism of other motion planning and distance keeping techniques, which is based on the assumption that surrounding vehicles will keep constant velocity and will not be affected by the host vehicle's behavior, the proposed prediction model is more accurate.

The prediction module generates a sequence of predicted scenarios from the current time t=0 to $t=t_{predictLength}$ with constant time step $\Delta t$. Each entrance ramp scenario is represented by the longitudinal positions, speeds, and lateral positions of the host, merging and surrounding vehicles $d_{host,merge,i}$, $v_{host,merge,i}$, $l_{host,merge,i}$. A cost for each scenario $C_{sce}$ is then computed, which consists of four different cost functions. The four cost functions include, progress cost, comfort cost, safety cost, and fuel consumption cost.

The progress cost ($C_{progress}$) represents how well a strategy does in finishing a given task by penalizing those strategies which take longer to finish the task. The goal of the distance keeper is to keep a desired distance $d_{desired}$ to its leader, which is represented as follows by the following equation:

$$d_{desired} = d_{min} + k_v v \quad (7)$$

where v is the current velocity of the vehicle, $d_{min}$ is the distance to the leader when the vehicle is stationary, and $k_v$ is the gain of the desired distance increase corresponding to v.

Comfort cost ($C_{comfort}$) represents scenarios when driving a vehicle, human drivers will generally try to avoid large accelerations for greater comfort.

The safety cost $C_{safety}$ of a scenario consists of two terms: the clear distance cost $C_{dis\ tan\ ce}$ and the braking distance cost $C_{brake}$. The clear distance cost $C_{dis\ tan\ ce}$ penalizes the host vehicle when it is moving too close to surrounding vehicles. However, this cost is not informative enough to avoid collision in some situations, since this factor does not consider the vehicles' relative velocities. Therefore, another safety cost based on the braking distance difference $\Delta d_{brake}$ between two vehicles is also considered.

The fuel consumption cost $C_{fuel}$ is proportional to the fuel usage as estimated by a comprehensive modal emission statistical model.

The parameters of these cost functions are selected based on case tests and statistical tests in a simulator with simulated traffic vehicles. The total cost of a scenario is the weighted sum of all these costs and is represented by the following formula:

$$C_{sce} = \mu_1 C_{progress} + \mu_2 C_{comfort} + \mu_3 C_{safety} + \mu_4 C_{fuel} \quad (8)$$

where $\mu_1, \mu_2, \mu_3$, and $\mu_4$ represent a weight factor. That is, various cost parameters may not be as important as others, and therefore, the equation may be forced to provide greater weight to those factors that are more important.

By summing the scenario costs together, the cost for the $i^{th}$ strategy for a given intention (I) is generated as follows:

$$C_{str(i)|I} = \sum_{t=0}^{t_{Predict}} (C_{sce(i,t)} | I) \quad (9)$$

where $C_{sce(i,t)}$ is a cost of an $i^{th}$ scenario for a respective time t, (I) is an intention, and $t_{Predict}$ is duration of time over which system will predict the respective scenario. For example, if short duration of time is selected (e.g., 5 seconds), then the initial results will be more accurate; however long estimations will be unknown. If a longer duration of time is selected (e.g., 10 seconds), then the system will predict long term results; however, inaccuracies may result, as changes, such as speed, may occur which may skew the cost estimation.

The following formula represents a cost for a respective strategy for a given set of probabilities of an intention (I) to yield and not yield. The formula is represented as follows:

$$C_{str(i)} = p(I=Y)C_{str(i)|Y} + p(I=N)C_{str(i)|N} \quad (10)$$

where p(I=Y) is a probability of the merging vehicle yielding during the merging maneuver, $p(I=Y)C_{str(i)}|Y$ is the cost associated to the host vehicle as a result of the merging vehicle yielding to the host vehicle, p(I=N) is a probability of the merging vehicle not yielding during the merging maneuver, and, $p(I=N)C_{str(i)}|N$ is the cost associated to the host vehicle as a result of the merging vehicle not yielding to the host vehicle.

To manage any uncertainty in the state variable I, a sample-based approach is used to compute the expectation of the strategy cost $C_{str(i)}$.

The best freeway entrance ramp management strategy is selected based on the lowest accumulated cost, which is computed using Eq. 10.

Figure 8A:
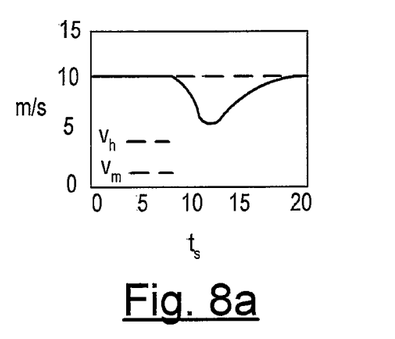
FIG. 8a illustrates a speed plot of the host and merging vehicle using adaptive cruise control.
Figure 8B:
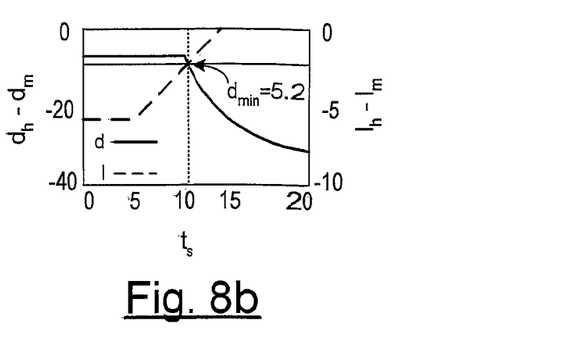
FIG. 8b illustrates a lateral and longitudinal plot of the host and merging vehicle using adaptive cruise control.

To verify the performance of the proposed iPCB framework for autonomous freeway driving entrance ramp management, case tests focused on qualitative analysis were implemented. FIGS. 8a and 8b show the speeds (host and merging) and lateral and longitudinal distances, respectively, between vehicles for the autonomous vehicle performing single-lane autonomous driving with three different algorithms. Since the adaptive cruise control system only considers vehicles in the same lane as the host vehicle, it does not react to the merging vehicle until it crosses the lane divider which causes emergency braking and an uncomfortably small distance between vehicles (5.2 m).

Figure 9A:
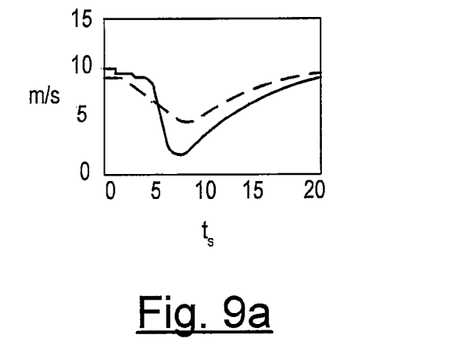
FIG. 9a illustrates a speed plot of the host and merging vehicle using geographical-based adaptive cruise control.
Figure 9B:
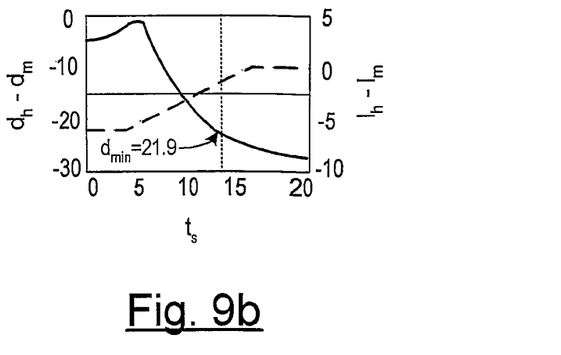
FIG. 9b illustrates a lateral and longitudinal plot of the host and merging vehicle using geographical-based adaptive cruise control.

FIGS. 9a and 9b illustrate an extension (i.e., geoACC) of the basic ACC for better handling of merging vehicles. This approach includes geographical information such as the shape of the road and entrance ramp and some rules governing whether the autonomous vehicle should yield. If the merging vehicle arrives before the host vehicle, then the autonomous system will decide to yield, as indicated by the following equation:

$$D_{host} = \begin{cases} N, & \text{if } \Delta t > 0 \\ Y, & \text{if } \Delta t < 0 \end{cases} \quad (11)$$

where $d_{host}$ is the host vehicle decision, and $\Delta t$ is determined using Eq. 4. If the host vehicle arrives before the merging vehicle, it will try get in front of the merging vehicle. Therefore, if the decision is Y (yield), then the autonomous vehicle will perform distance keeping on the merging vehicle while it is still on the entrance ramp. If it is N (not yield), it will ignore the vehicle on the ramp.

If the host and merging vehicles arrive at around the same time, these rules may result in oscillation between the yield and not yield decisions which results in a scenario difficult to handle by the geoACC. Another problematic case of the geoACC algorithm is when the merging vehicle wants to perform some social interaction with the host vehicle, which the host vehicle does not understand. This is indicated in FIGS. 9a and 9b. At the beginning, the host vehicle decides to yield to the merging vehicle because $\Delta t \leq 0$. However, the merging vehicle wants to yield to the host vehicle, as well. The result is that the merging vehicle decreases its speed, and the host vehicle applies distance keeping to it, further decreasing its speed. This social misunderstanding causes the host vehicle to brake very hard to keep a safe distance to the merging vehicle, but this causes a potentially dangerous situation on highways. For a human driver, as long as it is understood that the merging vehicle wants to yield, the host vehicle decision will switch from yield to not yield in most situations.

Figure 10A:
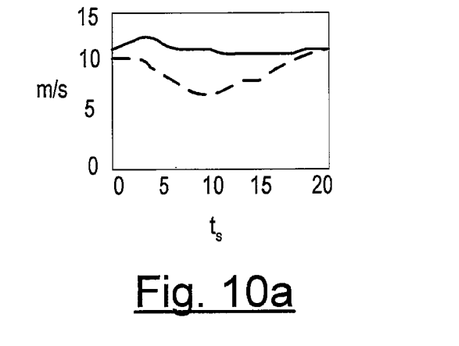
FIG. 10a illustrates a speed plot of the host and merging vehicle using the iPCB system.
Figure 10B:
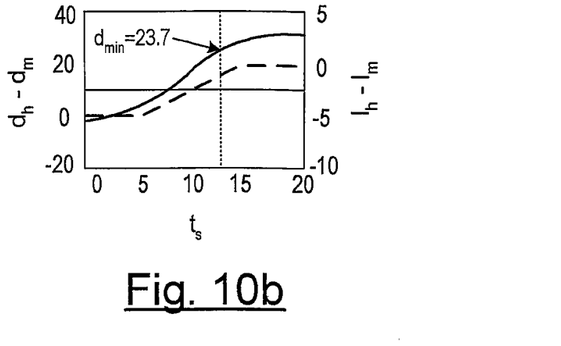
FIG. 10b illustrates a lateral and longitudinal plot of the host and merging vehicle using the iPCB system.

In contrast to these two approaches based on the current ACC system, the iPCB algorithm can actively perform a behavior that attempts to convey its preference to the merging vehicle in the social cooperation. For testing purposes, the most ambiguous scenario is created, in which the host and merging vehicles have the same longitudinal coordinate and speed, and the merging vehicle is told to have an intention to yield (I=Y). In the iPCB plots of FIGS. 10a and 10b, as soon as the merging vehicle performs an intentional behavior (deceleration to yield to the host vehicle), the host vehicle understands it and begins to accelerate slightly to clearly show the merging car its cooperative behavior. This makes the speed variation of both vehicles much smaller and the distance between vehicles when the merging vehicle cuts in very close to the desired distance keeping distance $d_{desired}$.

In summary, the iPCB technique described herein performs in the most reasonable and cooperative manner to interact with merging vehicles on entrance ramps. It increases the smoothness of the velocity adjustment and also keeps the distance between merging and autonomous vehicles in a safe range.

In test cases conducted herein, the iPCB algorithm's general ability to perform social behavior was verified. A statistical test was implemented in simulation to analyze its ability to deal with a wide variety of different entrance ramp management scenarios. The simulation for each algorithm was run 10,000 times to get a more accurate statistical result.

TABLE I illustrates exemplary parameters ranges utilized for these statistical tests.

| Parameter | Min | Max |
| --- | --- | --- |
| $d_{merge}$ (m) | −60.0 | 20.0 |
| $v_{merge}$ (m/s) | 5.0 | 15.0 |
| $i_{merge}$ | Y or N | |
| $d_{host}$ (m) | −60.0 | 20.0 |
| $v_{host}$ (m/s) | 5.0 | 15.0 |

TABLE II shows the result of this test, where $C_{ave}$ is the average strategy cost.

|  | ACC | geoACC | iPCB |
|---|---|---|---|
| $C_{ave}$ | 52.25 | 56.61 | 30.58 |
| $C_{safety}$ | 7.51 | 6.56 | 2.45 |
| $C_{dk}$ | 20.73 | 20.55 | 21.94 |
| $C_{acc}$ | 4.84 | 6.56 | 0.66 |
| $N_{danger}$ | 52 | 62 | 9 |

$C_{safety}$, $C_{acc}$, $C_{dk}$ are respectively the safety, comfort, and distance keeping progress cost. $N_{danger}$ is the number of cases in which the car needed to apply hard braking (with deceleration larger than 3 m/s²) to avoid an accident.

The iPCB algorithm clearly provides the lowest strategy cost, which indicates that the quality of the decision making at entrance ramps is improved. Compared with the ACC and geoACC approaches, the safety and acceleration costs are reduced considerably, meaning the control of the vehicle is smoother and safer. The number of potentially dangerous scenarios is also greatly reduced by using the iPCB algorithm due to its ability to react earlier to merging vehicles based on their intention. This test also verifies that the iPCB algorithm framework is beneficial across a wide range of entrance ramp scenarios.

Once the autonomous maneuver is selected that provides the lowest cost and greatest benefit for performing the merging maneuver, control signals are provided to one or more controllers for controlling the autonomous driving system for seamlessly merging with vehicles entering the freeway merging lane. For example, a vehicle speed controller may be used to control the speed of the vehicle to follow a selected strategy in an attempt to illicit a respective intention from the merging vehicle. The behavior of the merging vehicle is constantly monitored, and depending on the response of the merging vehicle, the current strategy for the identified intention may be continuously applied, or another strategy may be selected and the speed controller will react accordingly.

It should be understood that the embodiments described herein are not limited to high entrance ramps, but may also be applied to lane changes (using, for example, lateral and longitudinal accelerations) and other driving maneuvers that require a host vehicle to monitor surrounding vehicles and cooperatively allow a remote vehicle access to the host vehicle's lane.

While certain embodiments of the present invention have been described in detail, those familiar with the art to which this invention relates will recognize various alternative designs and embodiments for practicing the invention as defined by the following claims.

What is claimed is:

1. An autonomous driving merge management system comprising:
   an autonomous driving control device for autonomously controlling accelerations of a host vehicle;
   an intention decision management system comprising:
      a candidate strategy subsystem generating a plurality of candidate driving strategies, each candidate driving strategy being a potential driving strategy executable by the host vehicle;
      a merging vehicle behavior recognition subsystem predicting a merging intention of a merging vehicle; the merging intention relating to a positive acceleration or a negative acceleration of the merging vehicle;
      an intention-based interactive prediction subsystem predicting future merging scenarios between the host vehicle and merging vehicle as a function of inputs by the merging vehicle behavior recognition subsystem and inputs by the candidate strategy subsystem;
      a cost function-based evaluation subsystem determining a cost for each future merging scenario generated by the intention-based interactive prediction subsystem; and
   a processor for selecting a merge strategy of the host vehicle based on intention-based prediction results and cost function-based evaluation results;
   wherein the autonomous driving control device applies the merge strategy to the host vehicle for allowing the merging vehicle to cooperatively merge with the host vehicle.

2. The autonomous driving merge management system of claim 1 wherein the cost function-based evaluation subsystem determines the cost for each scenario based on a progress cost, a comfort cost, a safety cost, and fuel consumption cost associated with a respective scenario.

3. The autonomous driving merge management system of claim 2 wherein the progress cost includes an efficiency of completing a task during a merging maneuver.

4. The autonomous driving merge management system of claim 2 wherein the comfort cost includes avoiding excessive accelerations of the vehicle to complete the merging maneuver.

5. The autonomous driving merge management system of claim 2 wherein the safety cost includes maintaining a respective distance to the merging vehicle and maintaining a braking distance based on the velocity of the host vehicle and merging vehicle.

6. The autonomous driving merge management system of claim 2 wherein the fuel consumption cost includes an amount of fuel expended to complete a merging maneuver.

7. The autonomous driving merge management system of claim 2 wherein the cost function-based evaluation subsystem determines the cost for a respective scenario based on the following formula:

$$C_{sce} = \mu_1 C_{progress} + \mu_2 C_{comfort} + \mu_3 C_{safety} + \mu_4 C_{fuel} \quad (8)$$

where $C_{progress}$ is the progress cost, $C_{comfort}$ is the comfort cost, $C_{safety}$ is the safety cost, $C_{fuel}$ consumption cost, and $\mu_1, \mu_2, \mu_3$, and $\mu_4$ represent weight factors.

8. The autonomous driving merge management system of claim 7 wherein a cost for a respective strategy for a respective intention is represented by the following formula:

$$C_{str(i)|I} = \sum_{t=0}^{t_{Predict}} (C_{sce(i,t)} | I)$$

where $C_{sce(i,t)}$ is a cost of an $i^{th}$ scenario for a respective time t, I is an intention, and $t_{Predict}$ is a duration of time over which system will predict the respective scenario.

9. The autonomous driving merge management system of claim 8 wherein a cost for a respective strategy given a respective probability of an intention is represented by the following formula:

$$C_{str(i)} p(I=Y) C_{str(i)} | Y + p(I=N) C_{str(i)} | N$$

where p(I=Y) is a probability of the remote vehicle yielding during the merging maneuver, p(I=Y)$C_{str(i)}$|Y is the cost associated to the host vehicle given the probability as a result of the merging vehicle yielding to the host vehicle, p(I=N) is a probability of the merging vehicle not yielding during the merging maneuver, and p(I=N)C$_{str(i)}$|N is the cost associated to the host vehicle given the probability as a result of the merging vehicle not yielding to the host vehicle.

10. The autonomous driving merge management system of claim 1 wherein the merging vehicle behavior recognition subsystem utilizes a statistical merging vehicle model for determining a vehicle behavior of the merging vehicle.

11. The autonomous driving merge management system of claim 1 wherein statistical merging vehicle model is represented by the following formula:

$$p(Y|B) = p(B|Y)p(Y)/[p(Y)p(B|Y) + p(N)p(B|N)]$$
$$= p(B|Y) \times 0.5/[0.5p(B|Y) + 0.5p(B|N)]$$
$$= p(B|Y)/[p(B/Y) + p(B|N)]$$

where p(Y|B|) is the probability of merging vehicle's intention to yield (Y) given an observed behavior B, and p(B|Y) and p(B|N) are respectively probabilities of the same behavior given intention Y or N.

12. The autonomous driving merge management system of claim 10 wherein the statistical merging vehicle model is derived from a deterministic model utilizing a Gaussian distribution.

13. The autonomous driving merge management system of claim 10 wherein the statistical merging vehicle model is represented by the following equations:

$$d_{yield} = d_C - (d_{min} + k_v v_{host})$$

$$d_{nyield} = d_C + (d_{min} + k_v v_{host})$$

$$\Delta t = (dd_{yield,nyield} - d_{merge})/v_{merge} - (d_C - d_{host})/v_{host}$$

$$acc_{merge} = c_{gain} \Delta t$$

where $d_{yield}$ is the distance from C to $D_{yield}$, $d_{nyield}$ the distance from C to $D_{nyield}$, $d_{min}$ is the minimum desired distance to the leading vehicle, k is a gain causing the desired distance to grow with the host vehicle's speed, $d_{merge}$ and $d_{host}$ are the positions of the merging and host vehicles at any given instance of time, $acc_{merge}$ is a desired control command for the merging vehicle, $\Delta t$ is a time difference between the host vehicle and merging vehicle arrivals at C, and $c_{gain}$ is the proportional gain converting the time difference into the acceleration command of the merging vehicle.

14. The autonomous driving merge management system of claim 1 wherein the autonomous driving control device includes a speed controller device.

15. The autonomous driving merge management system of claim 1 wherein the intention decision management system determines an intention of the merging vehicle to merge relative to the host vehicle when transitioning from an entrance ramp to a primary driven road traveled by the host vehicle.

16. The autonomous driving merge management system of claim 1 wherein the intention decision management system determines an intention of the merging vehicle relative to the host vehicle when changing lanes from an adjacent lane to a primary driven lane of the host vehicle.

17. A method for autonomously controlling a vehicle speed during a merging maneuver between a host vehicle and a merging vehicle, the method comprising the steps of:

obtaining speed data and position data of the host vehicle and the remote data;

generating a plurality of candidate driving strategies by a processor, each candidate driving strategy being a potential driving strategy executable by the host vehicle;

predicting an intention of the merging vehicle to merge forward or rearward of the host vehicle by the processor, generating a plurality of merging scenarios between the host vehicle and merging vehicle by the processor as a function of the predicted merging intention of the merging vehicle and the plurality of candidate driving strategies;

determining a cost for each merging scenario by the processor based on a cost function evaluation analysis technique;

selecting a merge strategy of the host vehicle by the processor based on the cost function evaluation results; and autonomously controlling accelerations of a host vehicle using an autonomous driving control device, wherein the autonomous driving control device applies the merge strategy to the host vehicle for cooperatively allowing the merging vehicle to cooperatively merge with the host vehicle.

18. The method of claim 17 wherein processor determines the cost for each scenario based on a progress cost, a comfort cost, a safety cost, and fuel consumption cost associated with a respective scenario.

19. The method of claim 18 wherein the processor determines the cost for a respective scenario based on the following formula:

$$C_{sce} = \mu_1 C_{progress} + \mu_2 C_{comfort} + \mu_3 C_{safety} + \mu_4 C_{fuel} \qquad (8)$$

where $C_{progress}$ is the progress cost, $C_{comfort}$ is the comfort cost, $C_{safety}$ is the safety cost, $C_{fuel}$ fuel consumption cost, and $\mu_1, \mu_2, \mu_3$, and $\mu_4$ represent weight factors.

20. The method of claim 19 wherein a cost for a respective strategy for a respective intention is represented by the following formula:

$$C_{str(i)|I} = \sum_{t=0}^{t_{Predict}} (C_{sce(i,t)} | I)$$

where $C_{sce(i,t)}$ is a cost of an $i^{th}$ scenario for a respective time t, I is an intention, and $t_{Predict}$ is a duration of time over which system will predict the respective scenario.

21. The method of claim 20 wherein a cost for a respective strategy given a respective probability of an intention is represented by the following formula:

$$C_{str(i)} = p(I=Y)C_{str(i)}|Y + p(I=N)C_{str(i)}|N$$

where p(I=Y) is a probability of the remote vehicle yielding during the merging maneuver, p(I=Y)C$_{str(i)}$|Y is the cost associated to the host vehicle given the probability as a result of the merging vehicle yielding to the host vehicle, p(I=N) is a probability of the merging vehicle not yielding during the merging maneuver, and p(I=N)C$_{str(i)}$|N is the cost associated to the host vehicle given the probability as a result of the merging vehicle not yielding to the host vehicle.

* * * * *